United States Patent
Jager et al.

(10) Patent No.: US 6,841,181 B2
(45) Date of Patent: Jan. 11, 2005

(54) ENCAPSULATED MULTIFUNCTIONAL BIOLOGICALLY ACTIVE FOOD COMPONENT, PROCESS FOR ITS PRODUCTION AND ITS USE

(75) Inventors: Martin Jager, Gauersheim (DE); Bernd Haber, Mainz (DE); Benno Kunz, Meckenheim (DE); Stephanie Sträter, Roesrath-Hasbach (DE); Jenny Weissbrodt, Wiehl (DE); Hartmut Bollinger, Neuler (DE); Hans-Georg Brendle, Ellwangen (DE); Georg Bache, Buehlertann (DE)

(73) Assignees: Nutrinova Nutrition Specialties & Food Ingredients GmbH, Frankfurt am Main (DE); J. Rettenmaler & Soehne GmbH & Co., Rosenberg (DE)

( * ) Notice: Subject to any disclaimer, the term of this patent is extended or adjusted under 35 U.S.C. 154(b) by 0 days.

(21) Appl. No.: 09/747,850

(22) Filed: Dec. 21, 2000

(65) Prior Publication Data

US 2001/0016220 A1 Aug. 23, 2001

(30) Foreign Application Priority Data

Dec. 22, 1999 (DE) .......................... 199 62 427

(51) Int. Cl.$^7$ .............................. A23L 1/308; A23P 1/08
(52) U.S. Cl. .............................. 426/61; 426/92; 426/96; 426/97; 426/615; 426/807
(58) Field of Search .............................. 426/97, 92, 96, 426/807, 615, 61

(56) References Cited

U.S. PATENT DOCUMENTS

| | | | |
|---|---|---|---|
| 4,619,831 A | 10/1986 | Sharma | 426/93 |
| 4,877,621 A | * 10/1989 | Ardaillon et al. | 424/498 |
| 4,927,649 A | 5/1990 | Antenucci | 426/273 |
| 5,429,832 A | * 7/1995 | Ueda et al. | 426/96 |
| 5,545,414 A | 8/1996 | Behr et al. | 424/484 |
| 6,120,811 A | * 9/2000 | Ghani | 426/61 |

FOREIGN PATENT DOCUMENTS

| | | |
|---|---|---|
| CN | 1113515 A | 12/1995 |
| CN | 1124773 A | 6/1996 |
| WO | WO 9608261 A1 | 3/1996 |
| WO | WO 9716077 A1 | 5/1997 |
| WO | WO 9734592 A1 | 9/1997 |
| WO | WO 9734615 A1 | 9/1997 |
| WO | WO 9826787 A1 | 6/1998 |
| WO | WO 9920745 A1 | 4/1999 |
| WO | WO 9952511 A1 | 10/1999 |
| WO | WO 9957242 A1 | 11/1999 |
| WO | WO 00/74501 A1 | 12/2000 ........... A23L/1/308 |

OTHER PUBLICATIONS

L. Jackson and K. Lee, *Microencapsulated Iron for Food Fortification*, Journal of Food Science 1991 vol. 56, No. 4.
K. Dewettinck *Fluidized Bed Coating in Food Technology: Process and Product Quality* 1997–1998, 1–37.
R. Pegg and F. Shahidi *Encapsulation and Controlled Release in Food Preservation* Food Service and Technology 1999, No. 94, 611–117.
*Microencapsulation By Spray Drying Drying Technology* 1998, 16(6), 1195–1236.
B.C. Larisch, D. Poncelet, C.P. Champagne, R.J. Neufeld *Microencapsulation of Lactococcus lactis subsp. Cremoris J Microencapsulation*, 1994, vol. 11, No. 2, 189–195.
H.S. Kim, B.J. Kamara, I.C. Good, G.L. Enders, Jr. *Method for the Preparation of Stabile Microencapsulated Lactic Acid Bacteria*. Journal of Industrial Microbiology, 1998, 3, 253–257.
C. Amiet–Charpenther, P. Gadille, B. Digat, J.P. Benoit, *Microencapsulation of rhizobacteria by spray–drying: formulation and survival studies J Microencapsulation*, 1998, vol. 15, 639–659.
T. Hammill, R. Crawford, *Bacterial microencapsulation with three algal polysaccharides*, Can J. Microbiol., 1997 43, 1091–1095.
R. Arshady; *Microcapsules for food; J. Microencapsulation*, 1993, vol. 10, No. 4, 413–435.
S. Hegenbart; *Encapsulated Ingredients Keep Problems Covered; Food; Product*, Apr. 1993—Cover Story.
S.K. Kanawija et al.; Microencapsulation of Enzymes, Micro–Organisms and Flavours and Their Applications in Foods; *Indian Dairyman*, 44, 6, 1992.

* cited by examiner

*Primary Examiner*—Helen Pratt
(74) *Attorney, Agent, or Firm*—ProPat. L.L.C.

(57) ABSTRACT

The invention relates to a multifunctional encapsulated biologically active food component consisting of a core which comprises at least one dietary fiber, which core is surrounded by at least one biologically active substance, in which the core and the biologically active substance(s) is (are) surrounded by one or more shell-forming substance(s).

17 Claims, No Drawings

ENCAPSULATED MULTIFUNCTIONAL BIOLOGICALLY ACTIVE FOOD COMPONENT, PROCESS FOR ITS PRODUCTION AND ITS USE

The invention relates to a multifunctional encapsulated biologically active food component which consists of a core that comprises at least one dietary fiber, which core is surrounded by at least one biologically active substance and in which the core and the biologically active substance are surrounded by at least one shell-forming substance. The stability of the multifunctional food component is based on interactions of the components with one another.

BACKGROUND OF THE INVENTION

Biologically active substances in nutrition are physiologically important components. They can have the most varied functions in the organism and as a result make a positive contribution to health. Biologically active substances can act, for example, as classical nutrients, can stimulate immune activity or have protective activity or intervene in physiological processes in the body. Biologically active substances can include, inter alia, probiotic microorganisms, prebiotic substances, nutrients or secondary plant constituents. Enrichment of the diet with components of this type in a stable and in particular bioavailable form is therefore desirable from the nutritional aspect.

Dietary fibers are a heterogeneous product group. Many dietary fiber preparations are based on plant fibers and consist predominantly of water-insoluble polysaccharides in addition to pectin, lignin and plant gums (for example wheat fibers, oat dietary fibers, rice dietary fibers, apple fibers, citrus dietary fibers etc.). In addition there are also soluble dietary fibers which are mostly made up of complex carbohydrates (for example fructo- or galactooligosaccharides, β-glucans etc.). Dietary fibers taken in via the diet are distinguished by the fact that they are indigestible constituents for humans. Because of their inert character, dietary fibers reside in the intestine and can there optimally exert their physiological effects, for example increasing intestinal peristalsis, effects on cholesterol absorption, prebiotic activities etc. An increased intake of dietary fibers is desirable for nutritional reasons. A daily intake of 25–30 g of dietary fiber is recommended by nutritionists.

For the reasons described it is expedient to provide dietary fibers and biologically active substances in a stable and nutritionally utilizable form via the diet or other delivery route to the organism. An optimal release of the biologically active substances, for the reasons described above, is not desirable until after passage through the stomach in the lower digestive tract. Furthermore, it is desirable that adverse sensory perceptions of nutritionally valuable substances in foods do not occur. This is, in the case of insoluble dietary fibers, frequently a marked sensory perception of particles in the food matrix ("scratchy off-taste").

The technique of microencapsulation has long been used commercially predominantly in the pharmaceutical industry. For some time, however, there have also been studies on the use of encapsulation in food technology (Jackson, Lee, 1991, Kanawija et al. 1992, Hegenbart, 1993, Arshady, 1993, Dewettinck, 1997, Pegg, Shahidi, 1999). The spray-drying process is one of the most frequently used processes for encapsulating various substances in the food industry. It can be considered as one of the essential advantages here that spray-drying is suitable for processing heat-sensitive materials. In addition, the process is inexpensive and offers the advantage that an existing technology can be utilized. In order to make possible targeted utilization for the various application sectors in the food industry, studies of the customary materials in different combinations would have to be carried out, since single materials cannot comply with the complex requirements which a food makes of the capsule material. Studies to date were concerned predominantly with decreasing the volatility of substances and their oxidation by embedding them into a suitable material. The effects resulting from the physicochemical properties of the capsule materials and of the physical conditions of this process require further study (Ré, M. I., Drying Technology, 1998, 16(6), 1195–1236).

Most patents or patent applications relate to fields of application in the pharmaceutical industry. The major roles are taken here by the capsule materials used (generally in combination with specific activities or effects), the controlled release of substances via the application of the encapsulating technique and the stabilization of substances. In the food sector there are far fewer patents, which, however, are essentially determined by these three directions. In the case of microencapsulation of cells or cell free extracts (CFE), physiological stability in combination with their use as a pharmaceutical product play the major roles.

Microencapsulation with the purposes of a) use of dietary fibers, in particular fibers as a support material for biologically active substances, in particular microorganisms with simultaneous increase of the nutritional value, b) support material/microorganism interactions, c) prevention of support material/capsule material interactions, d) stabilization of the biologically active substances in the product and in the food with correspondingly extended shelf life, has not been described to date.

Immobilization of lactococcus, which are less sensitive than lactobacillus species, is possible in a matrix made of alginate/polyamino acids. In this experiment a study was to be made as to what extent the stabilization, handling and storage of microorganisms may be improved by the immobilization. Lactic acid production, as an indicator of metabolic activity, was reduced, however, after handling and storage of the microorganisms in comparison with microorganisms which had not been embedded. No information was provided, however, on interactions of the capsule material with its direct environmental surroundings (for example foods) or with the microorganisms or the use of support materials (Larisch, B. C., Poncelet, D., Champagne, C. P., Neufeld, R. J., J. Microenc., 1994, Vol. 11, No. 2, 189–195).

The encapsulation of lactic acid bacteria of the genera Streptococcus, Lactobacillus, Pediococcus, has also been achieved in various materials using extrusion. In this case a study was made of the viability of the encapsulated organisms in acidic media simulating the gastrointestinal tract and of the shelf life and stability of the encapsulated microorganisms at various temperatures. It was found in this case that the survival rates depend on the physicochemical properties of the capsule materials. The shelf-life studies at different temperatures found increased survival rates of the encapsulated organisms at temperatures above 22° C. in comparison with the unencapsulated bacteria. No statements were made about metabolic performance and/or metabolic activity. (Kim, H. S., Kamara, B. J., Good, I. C., Enders Jr., G. L., J. Indust. Microbiol., 1988, 3, 253–257).

Encapsulation techniques for lactic acid bacteria are also described in various patents. WO-A 9716077 refers to probiotic formulations which can be used as food ingredients. In this case the microorganisms are mixed with a second substance as carrier or shell substance, which in the latter case leads to an improved stability to passage through the stomach. Production processes for formulations to increase the stability of such probiotic microorganisms in the gastrointestinal tract are also described in CN-A 1113515, CN-A 1124773, WO-A 9920745 or WO-A 9952511. In these cases, especially, encapsulation techniques are used in order to protect the microorganisms against gastric acid. A disadvantage of these processes is that the resultant formulations are not stable in most food applications.

WO-A 9608261, WO-A 9734615 and WO-A 9734592 describe the microencapsulation of probiotic microorganisms with modified and unmodified starches. In these cases the starch acts as transport medium for the probiotic microorganisms into the stomach. WO-A 9826787 describes a method in which improved passage through the gastrointestinal tract for probiotic microorganisms is achieved using β-glucan as support.

The spray-drying process can also be used to increase the stability and storage life of bacteria. Thus in the agricultural field, in the case of seed material, by spray-drying a strain of rhizobacteria, improved preservation and protection of the seed material against infection with disease and premature germination are achieved. Encapsulation was achieved using spray-drying with the use of various materials all of which except for one combination (modified starches) are not permitted for the food sector. (Amiet-Charpentier, C., Gadille, P., Digat, B., Benoit, J. P., J. Microenc., 1998, Vol. 15, No. 5, 639–659).

In the food sector, lactic acid bacteria were also stabilized via various drying processes. Thus WO-A 9957242 describes a process which gives preparations suitable for foods made from lactic acid bacteria with additional carbon-dioxide-generating additives via various drying processes. Increased stability of encapsulated microorganisms was demonstrated when algal polysaccharides were used as capsule material. In this case the aerobic microorganisms were embedded into the capsule material by crosslinking. The resultant microorganisms can be used in the environmental sector and displayed similarly good performance with respect to PCP degradation as non-embedded microorganisms. (Hammill, T. B., Crawford, R. L., Can. J. Microbiol., 1997, 43, 1091–1095).

A disadvantage of the above described processes and substances is that they are not stable in most food applications. When in particular microorganisms are added to foods, the resulting survival rates of the microorganisms are still too low to develop nutritional effects. Furthermore, with many biologically active formulations, adverse sensory perceptions occur. In addition, it is disadvantageous that the biologically active formulations, although they can pass to their destination (intestine), because of the pH, they cannot fully develop their activity there.

The object of the present invention was therefore to provide a system which simultaneously prevents an interaction with the surrounding food (for example in some cases prevents unwanted swelling properties of the dietary fibers)

provides nutritionally valuable substances without adverse sensory perceptions, ensures increased storage stability of nutritionally valuable substances and optimizes the quantitative supply and localization of release of the biologically active substances at the desired site (optimized bioavailability).

DESCRIPTION OF THE INVENTION

This object is achieved by a multifunctional encapsulated biologically active food component which consists of a core which comprises at least one dietary fiber, which core is surrounded by at least one biologically active substance, the core and the biologically active substance being surrounded by one or more shell-forming substances, which preferably form stable complexes with the core materials and/or the biologically active substances. Since in most cases the biologically active substances are labile compounds whose activity decreases during storage as the pure substance, during processing and during storage in the processed state, the universal stabilization method described below and the resultant substances are a considerable improvement compared with the prior art. In addition, the bioavailability of the abovementioned substances is frequently a problem. Using the method described, biologically active substances may be formulated such that the bioavailability and thus the utility to health is considerably increased.

For the purposes of the present invention, food components are natural and synthetic constituents of the human and/or animal diet. In addition, the food components are taken to mean constituents which are added specifically to the preparations and which supplement the human and/or animal diet (dietary supplements). This term also includes substances which are used in pharmaceuticals as nutritional components.

"Multifunctional" for the purposes of the invention means that the encapsulated food component fulfills two or more nutritional functions. These also include technical functions, for example delayed release of nutritionally active substances at the site of action or an improved sensory perception of the components in the food.

Encapsulated means that the substance in question is surrounded on all sides by a shell. Shell substances which can be used are in particular compounds which are able to form stable complexes with the core materials and/or the biologically active substances. Examples of these are mono-, di- and polysaccharides (hydrolyzed starches, microbial polysaccharides, plant polysaccharides, acidic plant gums, pectins, celluloses), emulsifiers, peptides, proteins and pre-biotic substances/substrates.

Stable complexes with the core materials and/or the biologically active substances are formed, in particular, when said materials interact with one another. Interactions here are taken to mean molecular and particulate interactions.

A dietary fiber is a substance defined by food law as a nutrient which is not metabolized at all or only to a small extent by the organism in question. Because of its inert character, dietary fibers reside in the intestine and can there exert optimally their physiological effects, such as increasing intestinal peristalsis, affecting cholesterol absorption, prebiotic effects etc. Examples of inventively usable dietary fibers are plant fibers (wheat fibers, oat fibers, rice dietary fibers, apple fibers, citrus fibers etc.), water-insoluble celluloses and hemicelluloses, but also water-soluble polysaccharides (for example β-glucans, fructo- and galactooligosaccharides), pectins, lignins or plant gums.

Hereinafter, "biologically active substances" are taken to mean materials which have the most varied nutritional functions in the organism and as a result make a positive contribution to the state of health. Biologically active substances can act, for example, as classical nutrients, can have immune-stimulating activity or protective activity or else can intervene in physiological processes in the organism.

Substances which can act as biologically active substances are, inter alia, probiotic microorganisms, prebiotic substances, enzymes, nutrients (vitamins, minerals, trace elements, amino acids etc.), natural or synthetic secondary plant constituents (for example carotenoids) or substances having antioxidant activity (for example flavonoids).

The encapsulated food components are spherical or polygonal structures having a mean diameter, in the unprocessed state, of from 1 $\mu$m to 200 $\mu$m, preferably from 20 to 100 $\mu$m, in particular <50 $\mu$m. In the processed state, the particle diameter remains unchanged, but it can also increase up to 5 fold.

The core content in the food component is, depending on the sought-after effect in the product in which the food components are to be used, from 10 to 90% by weight, preferably greater than 50% by weight. The content of the biologically active substance in the food component depends on its dose-dependent physiological activity and can be from less than 1% by weight to more than 50% by weight, preferably from 10 to 20% by weight. The content of the shell materials of the food component is determined by the target-product-oriented functionality and is up to 50% by weight, but preferably below 10% by weight.

To produce the inventive food components, expediently a procedure is followed such that the biologically active substance or the mixture of two or more biologically active substances is introduced into a medium which comprises one or more shell-forming substances. The resultant mixture is then enriched with the dietary fiber or the dietary fibers and homogeneously mixed and then freed from the solvent or dispersion medium.

If the biologically active substance is a microorganism suspension, it is produced by a fermentation, in which it must be ensured that sufficiently high cell densities are achieved, preferably >1·10$^9$ per ml CFU (colony forming units). If necessary, the microorganism suspension can also be concentrated by centrifugation, filtration or other concentration processes corresponding to the prior art. This step is necessary, in particular, if, at the customarily achievable cell densities, an adequately high concentration in the encapsulated food components cannot be achieved. Concentration can be carried out by two powers of ten to approximately 10$^{11}$ CFU per ml, but preferably by one power of ten.

In addition, it is expedient that components of the fermentation medium make a contribution to shell formation. Such substances can be, inter alia, proteins, peptides, carbohydrates or minerals.

When the biologically active substances are introduced into the solvent or dispersion medium, it must be ensured that a homogeneous distribution is achieved and, after the partial or complete removal of the solvent or dispersion medium, the sought-after quantitative ratio between dietary fiber, shell materials and biologically active substances is formed. If expedient, the shell-forming substance can also be charged first and the biologically active substances added to it.

When the mixture is produced, the sequence of addition of the individual components is of no importance, but care must be taken to ensure that unwanted aggregations do not occur. This applies in particular in the case of addition of minerals which dissociate in solution. Not until the following drying process, as a consequence of specifically intended interactions between the components of the shell materials, the biologically active substances and the dietary fibers, does formation of complexes occur, which complexes are of importance for stabilizing the encapsulated food components. The solvent or dispersion medium is removed by known drying processes, for example spray-drying, fluidized-bed drying, freeze drying etc., but preferably by spray-drying. In the cases where all constituents of the food component to be encapsulated are present in a dispersion, a single-component nozzle is used for spraying, which ensures the formation of sufficiently small particles during the spraying operation. Preferably, nozzles having a nozzle diameter of from 0.1 to 2.0 mm are used. However, it can also prove to be expedient that the shell material is not to come into contact with the mixture until immediately after encapsulation, so that they are combined in the drier via a two-component nozzle.

The advantage of the invention is that bioactive substances, by using dietary fibers, preferably fiber materials, can be processed to form food components in such a manner that they achieve high stability after the drying process, in the food in which they are incorporated, during storage of the food and in the gastrointestinal tract. The release of the food components with their physiologically multifunctional properties does not take place until at the optimum position in the gastrointestinal tract. Furthermore, technologically functional properties may be achieved in the food by incorporating the food components which lead to sensory enhancement, for example due to increased creaminess of the end product.

The invention can be used in very many food groups, such as milk products (fermented milk products, fresh cheese, cheese preparations), meat processing products (uncooked sausage, scalded-emulsion sausage, cooked-meat sausage, meat pies, meat salads), fruit and vegetable products (jams, jellies, fruit juices, vegetable purees, vegetable juices), bakery products (bread, rolls, patisserie products), beverages, but also in food supplements in animal nutrition (domestic and small animals; farm animals) and in cosmetics and in pharmaceuticals etc.

The invention is illustrated below on the basis of Examples.

EXAMPLE 1

1% by weight of wheat fibers is suspended in water, MRS broth is added and the mixture is autoclaved. This mixture is inoculated with a microorganism culture (Lactobacillus acidophilus) and fermented for 24 hours at 37° C. until a cell count of 10$^9$ CFU ml$^{-1}$ is achieved. Culture and wheat fibers are centrifuged off and rinsed once with a 0.1% strength by weight maltose solution. The supernatant is removed and the residue is taken up with 0.1% strength by weight maltose solution. In a second batch, the capsule material B, in this example 4% by weight of gum arabic, is suspended in water. By adding the microorganism/wheat fiber mixture to the capsule material, a sprayable dispersion is produced. This dispersion, during the subsequent spray-drying is vigorously stirred at 500 rpm to ensure uniform distribution of the material to be dispersed. The drying process was carried out using the following parameter settings:

| | |
|---|---|
| Drying air temperature: | 170–185° C. |
| Exhaust air temperature: | 55–60° C. |
| Spraying pressure: | 1 bar |
| Intake pressure: | 0.01 bar |

The resultant fine white powder was suspended in aqueous solution to determine the survival rate of the encapsulated microorganisms. The survival rate was >60% by weight.

In this example, the wheat fiber serves as a multifunctional food ingredient, firstly owing to its dietary fiber character, and to its simultaneous function as a support material for the microorganisms. Gum arabic acts as capsule material and maltose as processing aid and also as an additional C source for the bacteria.

EXAMPLE 2

The growth and fermentation conditions for the microorganisms are similar to those of Example 1. The suspension of the capsule materials is supplemented in this example by a network-forming protein with 2% by weight of gelatin, so that a copolymer of fixed capsule structures is formed. After production of the dispersion, consisting of microorganism suspension and capsule material suspension, this is dried as in Example 1.

EXAMPLE 3

The capsule material of this example is composed of a plurality of substances as followed: 3% by weight of gum arabic, 1% by weight of gelatin, 0.5% by weight of xanthan, 0.3% by weight of citric acid. The substances were dispersed in water with constant stirring and mixed with the suspension of microorganisms prepared according to Example 1. This mixture is dried under the same conditions as described in Example 1. The result is a finely crystalline powder having a microorganism density of >60% by weight, based on the starting amount.

Gum arabic and gelatin form a copolymer whose formation is supported by adding xanthan and citric acid. Xanthan can act simultaneously as energy source for the microorganisms, due to the amounts of acetate of pyruvate present therein.

EXAMPLE 4

In this example, in a targeted manner individual constituents of the culture medium (MRS broth) were integrated into the formation of a stable capsule/microorganism complex. The substances used here are ®Tween 80 at a concentration of 0.1% by weight as growth promoter for the bacteria, in addition 1% by weight of maltose, replacing glucose as C source, and, as complexing aid, 0.09% by weight of calcium acetate are used instead of sodium acetate. The bacterial suspension prepared according to Example 1 is taken up with a dispersion of the abovementioned substances in water. An aqueous 1–2% strength by weight alginate solution is then injected into the resultant mixture. The product obtained in this manner is dried in the spray tower as described in Example 1.

EXAMPLE 5

Similarly to the procedure in Example 4, certain constituents of the culture medium are replaced by substances which firstly can serve for capsule formation and secondly can serve as substrate for the microorganism. In this case the following were used: albumin as capsule material and as N source, lecithin as emulsifier and binding aid between protein and sugar, and as P source and maltose as aid during capsule formation and as C source. The substances are dissolved in water in the following concentrations: albumin 4% by weight, lecithin 0.5% by weight and maltose 0.5% by weight. The bacterial suspension produced as in Example 1 is added to this mixture. The dispersion is sprayed under the standard conditions specified in Example 1. A voluminous finely crystalline powder is obtained as a result of this process.

EXAMPLE 6

The microorganisms were cultured and fermented as in Example 1. To form the protective shell, in a first step, 3% by weight of pectins containing 0.5% by weight of inulin are suspended in water. The prepared bacterial suspension is added to this mixture. In a third step approximately 0.1% by weight of calcium chloride is added with constant stirring. The resultant mixture is spray-dried under standard conditions. In this example, pectin acts as capsule material, insulin is used as processing aid with prebiotic properties. By adding calcium chloride, the pectin forms what is termed a calcium-bridged gel.

EXAMPLE 7

A high-viscosity dispersion is given using 2.5% by weight of maltodextrin, 0.5% by weight of lecithin and 1% by weight of guar gum as capsule materials. This dispersion is mixed with the bacterial suspension produced according to Example 1 and sprayed under standard conditions. The substances maltodextrin and lecithin form a gel-like network, the gelation capacity of the polysaccharide used being increased by the guar gum used.

EXAMPLE 8

As described under Example 1, in this case also a microorganism suspension is prepared containing wheat fibers as support material. This suspension is taken up as follows using an aqueous 0.5% strength by weight xanthan solution for stabilization. The resultant mixture is mixed with a previously prepared dispersion of 2.5% by weight of albumin and 1% by weight of carboxymethylcellulose in water with constant stirring. The albumin used forms a complex with the carboxymethylcellulose, which complex acts as capsule material.

What is claimed is:

1. A multifunctional encapsulated biologically active structure consisting of a core comprising at least one dietary fiber, said core is surrounded by at least one biologically active substance, said core and biologically active substance(s) surrounded on all sides by one or more shell-forming substance(s), said shell-forming substance(s) forming stable complexes with at least one of either the core or the biologically active substance, wherein said biologically active substance(s) are microorganisms.

2. A structure according to claim 1 wherein said one or more shell-forming substance(s) is selected from the group consisting of one or more of the following substances; monosaccharides, disaccharides, polysaccharides, emulsifiers, peptides, proteins and prebiotic substances.

3. The structure as claimed in claim 1, wherein the dietary fiber is selected from the group consisting of plant fibers, water-insoluble polysaccharides, water-soluble polysaccharides, pectins, lignin and plant gums.

4. The structure as claimed in claim 3, wherein the plant fiber is selected from the group consisting of wheat fibers, apple fibers, and oat fibers.

5. The structure as claimed in claim 3, wherein the water-soluble polysaccharides are celluloses.

6. The structure as claimed in claim 1, wherein the dietary fiber is selected from the group consisting of one or more of the following substances: plant fibers, water-insoluble celluloses, water-insoluble hemicelluloses, water-soluble polysaccharides, pectins, lignins and plant gums.

7. The structure as claimed in claim 6, wherein the plant fibers are selected from the group consisting of wheat fibers, oat fibers, rice dietary fibers, apple fibers and citrus fibers.

8. The structure as claimed in claim 6, wherein the water-soluble polysaccharides are selected from the group consisting of β-glucans, fructo-oligosaccharides and galactooligosaccharides.

9. The structure as claimed in claim 1, which has a spherical or polygonal shape having a mean diameter, in the unprocessed state, of from about 1 μm to about 200 μm.

10. The structure as claimed in claim 1, wherein the core content is from about 10 to about 90% by weight.

11. The structure as claimed in claim 1, wherein the content of the biologically active substance is from <1% by weight to >50% by weight.

12. The structure as claimed in claim 1, wherein the content of shell materials in the food component is ≦50% by weight.

13. The structure as claimed in claim 2, wherein the polysaccharides are selected from the group consisting of hydrolyzed starches, microbial polysaccharides, plant polysaccharides, acidic plant gums, pectins and celluloses.

14. A multifunctional encapsulated biologically active structure according to claim 1, wherein said microorganisms have a cell density of greater than $1 \times 10^9$ per ml CFU.

15. A multifunctional encapsulated biologically active structure according to claim 1, wherein said microorganisms are cultured within a fermentation medium and said shell-forming substances further comprise at least one component derived from the fermentation medium.

16. A multifunctional encapsulated biologically active structure according to claim 1, further comprising at least one of either an energy source or growth promoter for said microorganisms.

17. A multifunctional encapsulated biologically active structure according to claim 1, wherein said shell-forming substance comprises at least one component selected from the group consisting of gum Arabic, gelatin, pectin, maltodextrin, and carboxymethyl cellulose.

* * * * *